(12) United States Patent
Liu

(10) Patent No.: US 10,569,218 B2
(45) Date of Patent: Feb. 25, 2020

(54) MULTIPLE MEMBRANE SEPARATION PROCESS USING GLASSY POLYMERIC MEMBRANE AND RUBBERY POLYMERIC MEMBRANE

(71) Applicant: UOP LLC, Des Plaines, IL (US)

(72) Inventor: Chunqing Liu, Arlington Heights, IL (US)

(*) Notice: Subject to any disclaimer, the term of this patent is extended or adjusted under 35 U.S.C. 154(b) by 186 days.

(21) Appl. No.: 15/675,436

(22) Filed: Aug. 11, 2017

(65) Prior Publication Data

US 2018/0133644 A1　May 17, 2018

Related U.S. Application Data

(60) Provisional application No. 62/423,689, filed on Nov. 17, 2016.

(51) Int. Cl.
*B01D 53/22* (2006.01)
*C01B 3/50* (2006.01)
(Continued)

(52) U.S. Cl.
CPC ......... *B01D 53/228* (2013.01); *B01D 53/226* (2013.01); *C01B 3/503* (2013.01); *C08J 7/047* (2013.01); *C10L 3/104* (2013.01); *C10L 3/105* (2013.01); *B01D 69/12* (2013.01); *B01D 71/16* (2013.01); *B01D 71/32* (2013.01); *B01D 71/50* (2013.01); *B01D 71/64* (2013.01); *B01D 71/68* (2013.01); *B01D 71/70* (2013.01);
(Continued)

(58) Field of Classification Search
CPC .... B01D 53/226; B01D 53/228; B01D 69/10; B01D 69/12; B01D 71/16; B01D 71/32; B01D 71/50; B01D 71/64; B01D 71/68; B01D 71/70; B01D 2317/02; B01D 2317/022; B01D 2317/025; B01D 2323/30; C10L 3/104; C10L 3/105; C10L 2290/10; C10L 2290/548
See application file for complete search history.

(56) References Cited

U.S. PATENT DOCUMENTS

| 3,133,132 A | 5/1964 | Sidney et al. |
| 4,602,922 A * | 7/1986 | Cabasso ................. B01D 69/12 427/245 |

(Continued)

FOREIGN PATENT DOCUMENTS

| IN | 200402071 | 8/2006 |
| JP | 62286518 A | 12/1987 |
| WO | 2016136294 A1 | 9/2016 |

OTHER PUBLICATIONS

Xing, Crosslinked polyvinylalcohol-polysiloxane/fumed silica mixed matrix membranes containing amines for CO2/H2 separation, Journal of Membrane Science vol. 367, Issue 1-2, Feb. 1, 2011, pp. 91-102.

(Continued)

*Primary Examiner* — Jason M Greene

(57) ABSTRACT

Combining the features of a glassy polymeric membrane and a rubbery polymeric membrane into a multiple membrane system provides a system having the advantages of both of the types of membranes. The membranes may be in any order in the system and multiple glassy polymeric membranes and multiple rubbery polymeric membranes may be used.

10 Claims, 8 Drawing Sheets

(51) Int. Cl.
  *C08J 7/04* (2006.01)
  *C10L 3/10* (2006.01)
  *B01D 71/32* (2006.01)
  *B01D 71/68* (2006.01)
  *B01D 71/16* (2006.01)
  *B01D 71/64* (2006.01)
  *B01D 71/50* (2006.01)
  *B01D 69/12* (2006.01)
  *B01D 71/70* (2006.01)

(52) U.S. Cl.
  CPC .... *B01D 2256/16* (2013.01); *B01D 2256/245* (2013.01); *B01D 2257/102* (2013.01); *B01D 2257/504* (2013.01); *B01D 2323/30* (2013.01); *C01B 2203/0465* (2013.01); *C01B 2203/0475* (2013.01); *C08J 2381/06* (2013.01); *C08J 2483/07* (2013.01); *C10L 2290/10* (2013.01); *C10L 2290/548* (2013.01); *Y02C 10/10* (2013.01)

(56) References Cited

U.S. PATENT DOCUMENTS

| | | | |
|---|---|---|---|
| 5,176,724 A | 1/1993 | Saito et al. | |
| 5,538,536 A * | 7/1996 | Fuentes | B01D 53/226 95/45 |
| 5,879,431 A | 3/1999 | Baker et al. | |
| 6,017,474 A | 1/2000 | Teo et al. | |
| 6,221,131 B1 * | 4/2001 | Behling | B01D 53/226 95/50 |
| 6,932,589 B2 | 8/2005 | Suzuki | |
| 9,289,730 B2 | 3/2016 | Bhandari et al. | |
| 2002/0152889 A1 * | 10/2002 | Baker | B01D 53/228 95/45 |
| 2003/0150795 A1 | 8/2003 | Dorgan et al. | |
| 2006/0138043 A1 * | 6/2006 | Kharul | B01D 53/228 210/490 |
| 2010/0313752 A1 | 12/2010 | Powell et al. | |
| 2014/0060324 A1 * | 3/2014 | Ahn | B01D 53/228 95/51 |
| 2015/0020685 A1 * | 1/2015 | Bhandari | B01D 71/70 96/10 |
| 2015/0174524 A1 * | 6/2015 | Wynn | B01D 53/226 95/45 |
| 2016/0107127 A1 | 4/2016 | Lee et al. | |
| 2016/0288047 A1 * | 10/2016 | Fukuda | B01D 53/226 |
| 2019/0030482 A1 * | 1/2019 | Ding | B01D 53/226 |

OTHER PUBLICATIONS

Rao, Gas separation properties of siloxane/polydimethylsiloxane hybrid membrane containing fluorine, Separation and Purification Technology, vol. 78, Issue 2, Apr. 11, 2011, pp. 132-137.

Peter, Multilayer composite membranes for gas separation based on crosslinked PTMSP gutter layer and partially crosslinked Matrimid® 5218 selective layer, Journal of Membrane Science, vol. 340, Issue 1-2, Sep. 15, 2009, pp. 62-72.

PCT Search Report dated Jan. 11, 2018 for corresponding PCT Application No. PCT/US2017/055890.

* cited by examiner

MULTIPLE MEMBRANE SEPARATION PROCESS USING GLASSY POLYMERIC MEMBRANE AND RUBBERY POLYMERIC MEMBRANE

BACKGROUND OF THE INVENTION

This application claims priority from Provisional Application No. 62/423,689 filed Nov. 17, 2016, the contents of which cited application are hereby incorporated by reference in its entirety.

FIELD OF THE INVENTION

The invention relates to a separation process employing at least one glassy polymeric membrane and at least one rubbery polymeric membrane.

BACKGROUND OF THE INVENTION

Over 170 Honeywell UOP Separex™ membrane systems have been installed in the world for gas separation applications such as for the removal of acid gases from natural gas, in enhanced oil recovery, and hydrogen purification. Two new Separex™ membranes (Flux+ and Select) have been commercialized recently by Honeywell UOP, Des Plaines, Ill. for carbon dioxide ($CO_2$) removal from natural gas. These Separex™ spiral wound membrane systems currently hold the membrane market leadership for natural gas upgrading. These membranes prepared from glassy polymers, however, do not have outstanding performance for organic vapor separations such as for olefin recovery, liquefied petroleum gas (LPG) recovery, fuel gas conditioning, natural gas dew point control, nitrogen removal from natural gas, etc.

Polymeric membrane materials have been found to be of use in gas separations. Numerous research articles and patents describe glassy polymeric membrane materials (e.g., polyimides, polysulfones, polycarbonates, polyamides, polyarylates, polypyrrolones) with desirable gas separation properties, particularly for use in oxygen/nitrogen separation (see, for example, U.S. Pat. No. 6,932,589). The polymeric membrane materials are typically used in processes in which a feed gas mixture contacts the upstream side of the membrane, resulting in a permeate mixture on the downstream side of the membrane with a greater mole fraction of one of the components than the composition of the original feed gas mixture. A pressure differential is maintained between the upstream and downstream sides, providing the driving force for permeation. The downstream side can be maintained as a vacuum, or at any pressure below the upstream pressure.

The separation of a polymeric membrane is based on a solution-diffusion mechanism. This mechanism involves molecular-scale interactions of the permeating gas with the polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2$/$CH_4$, $O_2$/$N_2$, $H_2$/$CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

The relative ability of a membrane to achieve the desired separation is referred to as the separation factor or selectivity for the given mixture. There are, however, several other obstacles to use a particular polymer to achieve a particular separation under any sort of large scale or commercial conditions. One such obstacle is permeation rate or flux. One of the components to be separated must have a sufficiently high permeation rate at the preferred conditions or extraordinarily large membrane surface areas are required to allow separation of large amounts of material. Therefore, commercially available glassy polymeric membranes, such as CA, polyimide, and polysulfone membranes formed by phase inversion and solvent exchange methods have an asymmetric integrally skinned membrane structure. See U.S. Pat. No. 3,133,132. Such membranes are characterized by a thin, dense, selectively semipermeable surface "skin" and a less dense void-containing (or porous), non-selective support region, with pore sizes ranging from large in the support region to very small proximate to the "skin". Plasticization occurs when one or more of the components of the mixture act as a solvent in the polymer often causing it to swell and lose its membrane properties. It has been found that glassy polymers such as cellulose acetate and polyimides which have particularly good separation factors for separation of mixtures comprising carbon dioxide and methane are prone to plasticization over time thus resulting in decreasing performance of these membranes.

Natural gas often contains substantial amounts of heavy hydrocarbons and water, either as an entrained liquid, or in vapor form, which may lead to condensation within membrane modules. The gas separation capabilities of glassy polymeric membranes are affected when contacting with liquids including water and aromatic hydrocarbons such as benzene, toluene, ethylbenzene, and xylene (BTEX). The presence of more than modest levels of liquid BTEX heavy hydrocarbons is potentially damaging to traditional glassy polymeric membrane. Therefore, precautions must be taken to remove the entrained liquid water and heavy hydrocarbons upstream of the glassy polymeric membrane separation steps using expensive membrane pretreatment system. Another issue of glassy polymeric polymer membranes that still needs to be addressed for their use in gas separations in the presence of high concentration of condensable gas or vapor such as $CO_2$ and propylene is the plasticization of the glassy polymer by these condensable gases or vapors that leads to swelling of the membrane as well as a significant increase in the permeance of all components in the feed and a decrease in the selectivity of the membranes.

Some natural gas also contains substantial amount of nitrogen ($N_2$) in additional to the heavy hydrocarbons, water, and acid gases such as $CO_2$ and hydrogen sulfide ($H_2S$). Traditional glassy polymeric membranes are relatively more permeable to $N_2$ than to methane. These membranes, however, have low $N_2$ permeance and low $N_2/CH_4$ selectivity of less than 5.

For glassy polymeric gas separation membranes, permeant diffusion coefficient is more important than its solubility coefficient. Therefore, these glassy polymeric gas separation membranes preferentially permeate the smaller, less condensable gases, such as $H_2$ and $CH_4$ over the larger, more condensable gases, such as $C_3H_8$ and $CO_2$. On the other hand, in rubbery polymeric membranes such as polydimethylsiloxane membrane, permeant solubility coefficients are much more important than diffusion coefficient. Thus, these rubbery polymeric membranes preferentially permeate the larger, more condensable gases over the smaller, less condensable gases. Polydimethylsiloxane (PDMS) is the most commonly used rubbery membrane material for separation of higher hydrocarbons or methane from permanent gases such as $N_2$ and $H_2$.

Most of the polyolefin such as polypropylene (PP) and polyethylene (PE) manufacturing plants and other polymer such as polyvinyl chloride (PVC) manufacturing plants use a degassing step to remove un-reacted olefins, solvents, and other additives from the raw polyolefin. Nitrogen is normally used as the stripping gas or for the polymer transfer. Disposing of the vent stream in a flare or partial recovery of the valuable olefin or other monomers via a condensing process results in the loss of valuable monomers and undesired emissions of the highly reactive volatile monomers into the air. Typically, the vent stream of the polymer reactor is compressed and then cooled to condense the monomers such as propylene and ethylene from the PP and PE reactors. The gas leaving the condenser still contains a significant amount of the monomers. One application for rubbery polymeric membranes is to recover the valuable monomers such as propylene, ethylene, and vinyl chloride and purify nitrogen for reuse from the vent stream. For olefin splitter overhead applications, the stream leaving the column overhead is primarily olefins, mixed with light gases such as $N_2$ or $H_2$. The membrane can separate the stream into an olefin-enriched stream and a light-gas-enriched stream. The olefin-enriched stream is returned to the distillation column, where the high value olefin is recovered, and the light-gas-enriched stream is vented or flared. The condensation/membrane hybrid process will achieve significantly higher olefin recovery than condensation process alone and also allows olefin recovery at moderate temperatures and pressures than condensation process.

Ethylene recovery during the ethylene oxide (EO) production process to prevent the loss of valuable ethylene feedstock is another potential application of rubbery polymeric membranes. The rubbery polymeric membrane separates ethylene from argon purge gas by permeating ethylene at a much faster rate than argon to generate ethylene-enriched permeate that will be returned to the EO reactor and argon-enriched residue that will be flared.

The rubbery polymeric membrane can also be used for fuel gas conditioning that will reduce heavier hydrocarbons and increase $CH_4$ content (methane number) in the fuel gas which will be used to power upstream oil and gas operations while maintaining the pressure of the tail gas. Glassy polymeric membranes normally have very low methane permeance and also relatively low methane/heavy hydrocarbon selectivities.

Combining the features of a glassy polymeric membrane and a rubbery polymeric membrane into a multiple membrane system provides a system having the advantages of both of the types of membranes. The membranes may be in any order in the system and multiple glassy polymeric membranes and multiple rubbery polymeric membranes may be used.

SUMMARY OF THE INVENTION

A multi-stage membrane process for removing nitrogen, carbon dioxide, or both from a feed gas comprising contacting the feed gas with a glassy polymeric membrane; contacting the feed gas with a rubbery polymeric membrane wherein the rubbery polymeric membrane is: (1) a chemically cross-linked rubbery polymeric thin film composite membrane comprising a selective layer of a chemically cross-linked rubbery polymer supported by a porous support membrane formed from a glassy polymer, or (2) a high flux, cross-linked, fumed silica reinforced polyorganosiloxane thin film composite membrane comprising a selective layer of a high flux, cross-linked, fumed silica reinforced polyorganosiloxane polymer supported by a porous support membrane formed from a glassy polymer; and collecting a product that is depleted in nitrogen, carbon dioxide, or both has been developed.

In one embodiment, the feed gas of the process is natural gas or hydrogen. In another embodiment of the invention, the feed gas is contacted with the glassy polymeric membrane before contacting the rubbery polymeric membrane. In another embodiment of the invention the feed gas is contacted with the rubbery polymeric membrane before contacting the glassy polymeric membrane.

In another embodiment the feed gas is contacted with a second or more glassy polymeric membrane, a second or more rubbery polymeric membrane, or both. The glassy polymeric membrane may be a cellulose acetate (CA) membrane, a cellulose triacetate (CTA) membrane, a blend of CA and CTA membrane, a polyimide (PI) membrane, a blend of polyethersulfone (PES) and PI membrane, a cross-linked PI membrane, a cross-linked blend of PI and PES membrane, a polybenzoxazole membrane, a polysulfone (PSF) membrane, a polycarbonate membrane, a fluoropolymer membrane, or a polymer with intrinsic microporosity membrane. The glassy polymer used to form the porous support membrane is PES, PSF, PI, a blend of PES and PI, a blend of PSF and PI, or a blend of CA and CTA.

In one embodiment the glassy polymeric membrane provides a glassy polymeric membrane retentate stream and a glassy polymeric membrane permeate stream and the glassy polymeric membrane retentate stream, the glassy polymeric membrane permeate stream, or both are contacted with a second glassy polymeric membrane, a second rubbery membrane, or both.

In one embodiment the rubbery polymeric membrane provides a rubbery polymeric membrane retentate stream and a rubbery polymeric membrane permeate stream and the rubbery polymeric membrane retentate stream, the rubbery polymeric membrane permeate stream, or both are contacted with a second glassy polymeric membrane, a second rubbery polymeric membrane, or both.

DETAILED DESCRIPTION OF THE INVENTION

Figure 1:
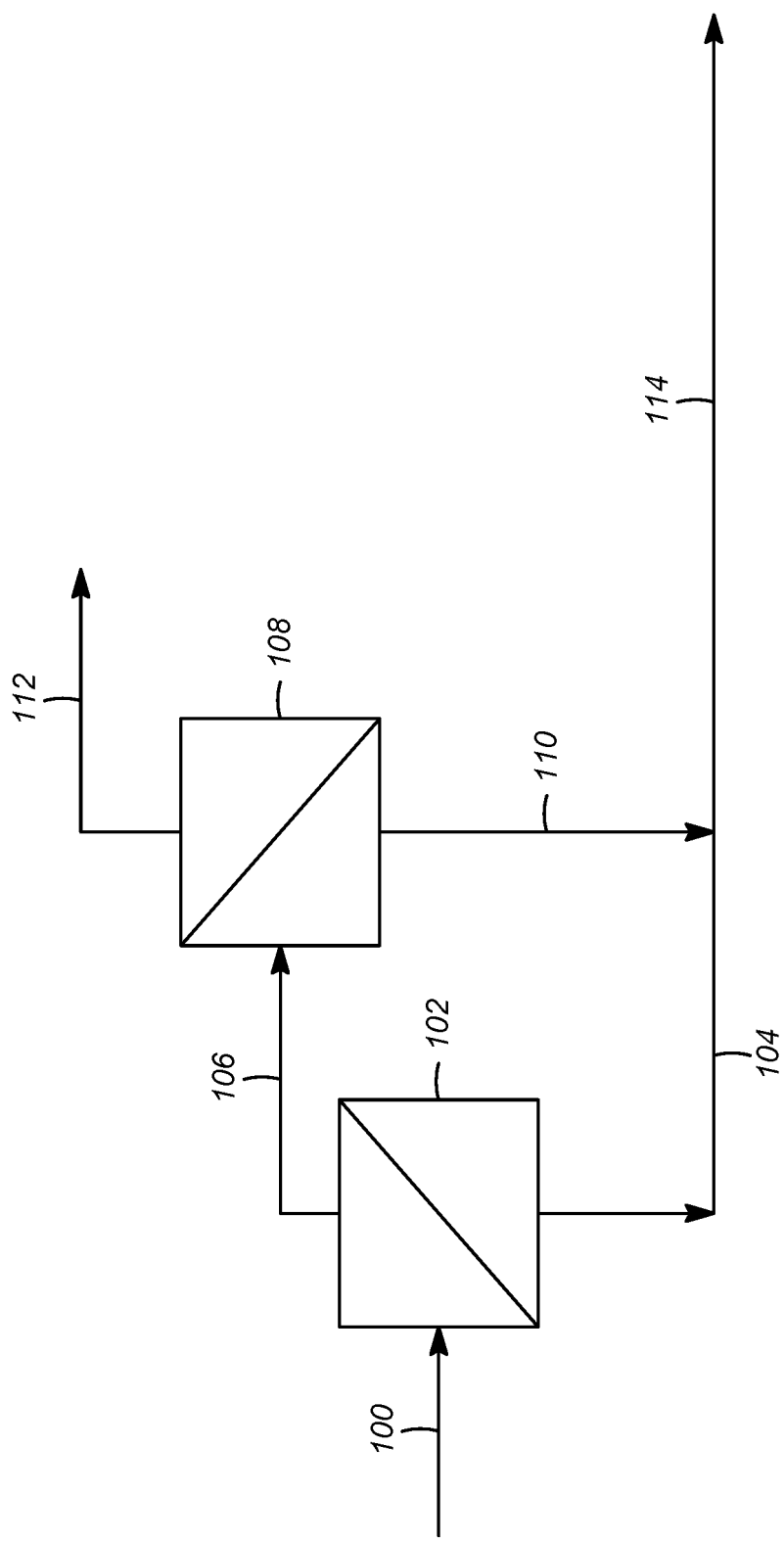
FIG. 1 shows a separation process flow scheme embodiment employing a glassy polymeric membrane and a rubbery polymeric membrane.

Membrane technology has been of great interest for the separation of gas, vapor, and liquid mixtures. However, despite significant research effort on separations by membrane technology, new rubbery polymeric membranes with improved performance are still needed for separations such as for olefin recovery, LPG recovery, fuel gas conditioning, natural gas dew point control, and nitrogen removal from natural gas. It is advantageous to combine glassy polymeric membranes with new rubbery polymeric membranes in a multiple membrane system to enhance separation of at least one component from a feed gas.

Glassy polymeric membranes include those such as cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, and polymer with intrinsic microporosity membrane. The new rubbery polymeric membranes include two families of membranes. A first family will be discussed in detail, and then a second family will be discussed in detail below. A first family includes a new high flux, cross-linked, fumed silica reinforced polyorganosiloxane thin film composite (TFC) membrane comprising a thin selective layer of a high flux, cross-linked, fumed silica reinforced polyorganosiloxane polymer on top of a porous glassy polymeric support membrane formed from a glassy polymer such as polyethersulfone (PES), polysulfone (PSF), polyimide (PI), a blend of PES and PI, a blend of PSF and PI, and a blend of cellulose acetate (CA) and cellulose triacetate (CTA). The high flux, cross-linked, fumed silica reinforced polyorganosiloxane polymer is formed from addition cure (or hydrosilylation reaction) between a fumed silica reinforced vinyl-terminated polyorganosiloxane polymer and a methylhydrosiloxane-dimethylsiloxane cross-linking copolymer or between a mixture of a fumed silica reinforced vinyl-terminated polyorganosiloxane polymer and a vinylorganosiloxane-dimethylsiloxane copolymer and a methylhydrosiloxane-dimethylsiloxane cross-linking copolymer in the presence of a platinum complex catalyst.

Different from glassy polymeric membranes that are highly selective to gases with smaller kinetic diameters over larger diameter gases, the new high flux, cross-linked, fumed silica reinforced polyorganosiloxane TFC membrane comprising a thin selective layer of a high flux, cross-linked, fumed silica reinforced polyorganosiloxane polymer on top of a porous glassy polymeric support membrane formed from a glassy polymer disclosed is highly selective to olefins and heavier hydrocarbons over methane and inert gases such as $N_2$ and $H_2$. Opposite from glassy polymeric membranes, the new high flux, cross-linked, fumed silica reinforced polyorganosiloxane TFC membrane described in the current invention has improved permeance and selectivity with the increase of operating time due to the increase of plasticization of condensable olefins on the membrane or with the decrease of operating temperature. In addition, the new high flux, cross-linked, fumed silica reinforced polyorganosiloxane TFC membrane described in the current invention has shown comparable selectivities but significantly higher permeance of $CH_4$ for $CH_4/N_2$ separation, significantly higher permeances of olefins and paraffins for olefin and LPG recovery and fuel gas conditioning applications than those of the polydimethylsiloxane rubbery membrane, the thermally cross-linked RTV615A/B silicone rubber membrane, and UV cross-linked epoxysilicone rubbery membrane.

The porous glassy polymeric support membrane can be formed from any glassy polymer that has good film forming properties such as PES, PSF, PI, a blend of PES and PI, a blend of PSF and PI, and a blend of CA and CTA. The porous glassy polymeric support membrane used for the preparation of the new high flux, cross-linked, fumed silica reinforced polyorganosiloxane TFC membrane disclosed is fabricated using a phase inversion process by casting the glassy polymer solution using a casting knife or spinning the glassy polymer solution using a spinneret. The porous glassy polymeric support membrane described in the current invention can be either an asymmetric integrally skinned membrane or a TFC membrane with either flat sheet (spiral wound) or hollow fiber geometry.

A porous glassy polymeric support membrane is part of the high flux, cross-linked, fumed silica reinforced polyorganosiloxane TFC membrane which is made by coating a thin selective layer of a high flux, cross-linked, fumed silica reinforced polyorganosiloxane polymer on top of the porous glassy polymeric support membrane. The porous glassy polymeric support membrane used for the preparation of the new high flux, cross-linked, fumed silica reinforced polyorganosiloxane TFC membrane has a carbon dioxide permeance of at least 100 GPU and no carbon dioxide/methane selectivity at 50° C. under 20 to 100 psig 10% $CO_2$/90% $CH_4$ mixed gas feed pressure.

The solvents used for dissolving the glassy polymer material for the preparation of the porous glassy polymeric support membrane are chosen primarily for their ability to completely dissolve the polymers, ease of solvent removal in the membrane formation steps, and their function for the formation of small pores on the skin layer of the support membrane. Other considerations in the selection of solvents include low toxicity, low corrosive activity, low environmental hazard potential, availability and cost. Representative solvents include most amide solvents that are typically used for the formation of the porous glassy polymeric support membrane, such as N-methylpyrrolidone (NMP) and N,N-dimethyl acetamide (DMAc), methylene chloride, tetrahydrofuran (THF), acetone, methyl acetate, isopropanol, n-octane, n-hexane, n-decane, methanol, ethanol, N,N-dimethylformamide (DMF), dimethyl sulfoxide (DMSO), lactic acid, citric acid, dioxanes, 1,3-dioxolane, glycerol, mixtures thereof, others known to those skilled in the art and mixtures thereof. Preferably, the solvents used for dissolving the glassy polymer material for the preparation of the porous glassy polymeric support membrane in the current invention include NMP, 1,3-dioxolane, glycerol, and n-decane.

The thin selective layer of the high flux, cross-linked, fumed silica reinforced polyorganosiloxane polymer is formed on top of the porous glassy polymeric support membrane by applying a dilute solution of a mixture of a fumed silica reinforced vinyl-terminated polyorganosiloxane polymer and a methylhydrosiloxane-dimethylsiloxane cross-linking copolymer in the presence of a platinum complex catalyst or a mixture of a fumed silica reinforced vinyl-terminated polyorganosiloxane polymer, a vinylorganosiloxane-dimethylsiloxane copolymer, and a methylhydrosiloxane-dimethylsiloxane cross-linking copolymer in the presence of a platinum complex catalyst to the top surface of the porous support membrane by dip-coating, spin coating, casting, soaking, spraying, painting, and other known conventional solution coating technologies. The thin selective layer of the high flux, cross-linked, fumed silica reinforced polyorganosiloxane polymer is formed by hydrosilylation reaction between the vinyl groups on the fumed silica reinforced vinyl-terminated polyorganosiloxane polymer or/and on vinylorganosiloxane-dimethylsiloxane copolymer and the silicon hydride groups on the methylhydrosiloxane-dimethylsiloxane cross-linking copolymer after evaporating the hydrocarbon organic solvent(s) and heating at 70° to 150° C. for a certain time.

The fumed silica reinforced vinyl-terminated polyorganosiloxane polymer used for the preparation of the high flux, cross-linked, fumed silica reinforced polyorganosiloxane TFC membrane provides the membrane with significantly improved mechanical strength under pressure for separation applications. The vinyl-terminated polyorganosiloxane polymer such as vinyl-terminated polydimethylsiloxane polymer is reinforced by fumed silica fillers such as hexamethyldisilazane treated fumed silica fillers. The vinylorganosiloxane-dimethylsiloxane copolymer used for the preparation of the new high flux, cross-linked, fumed silica reinforced polyorganosiloxane TFC membrane can be selected from vinylmethylsiloxane-dimethylsiloxane, vinylphenylsiloxane-dimethylsiloxane, and a mixture thereof. The organic solvents that can be used for dissolving the vinyl-terminated polyorganosiloxane polymer, vinylorganosiloxane-dimethylsiloxane copolymer, and methylhydrosiloxane-dimethylsiloxane cross-linking copolymer are essentially hydrocarbons such as n-heptane, n-hexane, n-octane, or mixtures thereof. It is preferred that these vinyl-terminated polyorganosiloxane polymer, vinylorganosiloxane-dimethylsiloxane copolymer, and methylhydrosiloxane-dimethylsiloxane cross-linking copolymer are diluted in the hydrocarbon organic solvent or mixtures thereof in a concentration of from about 1 to about 20 wt % to provide a defect-free, thin, high flux, cross-linked, fumed silica reinforced polyorganosiloxane selective layer.

The platinum complex catalyst used for the preparation of the high flux, cross-linked, fumed silica reinforced polyorganosiloxane TFC membrane can those platinum compound catalysts that are well soluble in the reaction mixture such as platinum carbonylcyclovinylmethylsiloxane complex, platinum divinyltetramethyldisiloxane complex, and platinum cyclovinylmethylsiloxane complex.

The high flux, cross-linked, fumed silica reinforced polyorganosiloxane TFC membrane comprising a thin selective layer of a high flux, cross-linked, fumed silica reinforced polyorganosiloxane polymer on top of a porous glassy polymeric support membrane may be made by a method comprising: a) preparation of a porous glassy polymeric support membrane from a glassy polymer such as polyethersulfone (PES), polysulfone (PSF), polyimide (PI), a blend of PES and PI, a blend of PSF and PI, and a blend of cellulose acetate (CA) and cellulose triacetate (CTA) via a phase inversion membrane fabrication process; b) coating a thin layer of a dilute solution of a mixture of a fumed silica reinforced vinyl-terminated polyorganosiloxane polymer and a methylhydrosiloxane-dimethylsiloxane cross-linking copolymer or a mixture of a fumed silica reinforced vinyl-terminated polyorganosiloxane polymer, a vinylorganosiloxane-dimethylsiloxane copolymer, and a methylhydrosiloxane-dimethylsiloxane cross-linking copolymer in the presence of a platinum complex catalyst on the top surface of the porous glassy polymeric support membrane by dip-coating, spin coating, casting, soaking, spraying, painting, and other known conventional solution coating technologies; c) evaporating the hydrocarbon organic solvents on said membrane and heating the coated membrane at 70° to 150° C. for a certain time to form the thin selective layer of high flux, cross-linked, fumed silica reinforced polyorganosiloxane polymer.

The high flux, cross-linked, fumed silica reinforced polyorganosiloxane TFC membrane comprising a thin selective layer of a high flux, cross-linked, fumed silica reinforced polyorganosiloxane polymer on top of a porous glassy polymeric support membrane described here can be fabricated into any convenient form suitable for a desired separation application. For example, the membranes can be in the form of hollow fibers, tubes, flat sheets, and the like. The new high flux, cross-linked, fumed silica reinforced polyorganosiloxane TFC membrane comprising a thin selective layer of a high flux, cross-linked, fumed silica reinforced polyorganosiloxane polymer on top of a porous glassy polymeric support membrane can be assembled in a separator in any suitable configuration for the form of the membrane and the separator may provide for co-current, counter-current, or cross-current flows of the feed on the retentate and permeate sides of the membrane. In one exemplary embodiment, the new high flux, cross-linked, fumed silica reinforced polyorganosiloxane TFC membrane comprising a thin selective layer of a high flux, cross-linked, fumed silica reinforced polyorganosiloxane polymer on top of a porous glassy polymeric support membrane is in a spiral wound module that is in the form of flat sheet having a thickness from about 30 to about 400 µm. In another exemplary embodiment, the high flux, cross-linked, fumed silica reinforced polyorganosiloxane TFC membrane comprising a thin selective layer of a high flux, cross-linked, fumed silica reinforced polyorganosiloxane polymer on top of a porous glassy polymeric support membrane is in a hollow fiber module that is in the form of thousands, tens of thousands, hundreds of thousands, or more, of parallel, closely-packed hollow fibers or tubes. In one embodiment, each fiber has an outside diameter of from about 200 micrometers (µm) to about 700 millimeters (mm) and a wall thickness of from about 30 to about 200 µm. In operation, a stream contacts a first surface of said high flux, cross-linked, fumed silica reinforced polyorganosiloxane TFC membrane comprising a thin selective layer of a high flux, cross-linked, fumed silica reinforced polyorganosiloxane polymer on top of a porous glassy polymeric support membrane, a permeate permeates said membrane and is removed therefrom, and a retentate, not having permeated said membrane, also is removed therefrom. In another embodiment, the high flux, cross-linked, fumed silica reinforced polyorganosiloxane TFC membrane comprising a thin selective layer of a high flux, cross-linked, fumed silica reinforced polyorganosiloxane polymer on top of a porous glassy polymeric support membrane can be in the form of flat sheet having a thickness in the range of from about 30 nm to about 400 µm.

The high flux, cross-linked, fumed silica reinforced polyorganosiloxane TFC membrane comprising a thin selective layer of a high flux, cross-linked, fumed silica reinforced polyorganosiloxane polymer on top of a porous glassy polymeric support membrane has higher permeance for paraffins such as ethane, propane, n-butane, and olefins such as propylene, n-butene, ethylene than inert gases such as $N_2$ and $H_2$ as well as $CH_4$ and has significantly higher permeances for paraffins such as ethane, propane, n-butane, and olefins such as propylene, n-butene, ethylene than those of the thermally cross-linked RTV615A/B silicone rubber membrane for olefin and $N_2$ recovery and $N_2$ removal from natural gas applications (see Tables 1 and 2).

This invention discloses the use of a two-stage or multi-stage system where at least one membrane is a high flux, cross-linked, fumed silica reinforced polyorganosiloxane TFC membrane comprising a thin selective layer of a high flux, cross-linked, fumed silica reinforced polyorganosiloxane polymer on top of a porous glassy polymeric support membrane for olefin recovery, LPG recovery, fuel gas conditioning, natural gas dew point control, nitrogen removal from natural gas, acid gas removal from natural gas and more.

Another family of rubbery polymeric membranes that can be used in this invention is a chemically cross-linked rubbery polymeric thin film composite (TFC) membrane comprising a thin selective layer of a chemically cross-linked rubbery polymer on top of a porous support membrane formed from a glassy polymer such as polyethersulfone (PES), polysulfone (PSF), polyimide (PI), a blend of PES and PI, a blend of PSF and PI, and a blend of cellulose acetate (CA) and cellulose triacetate (CTA), wherein said chemically cross-linked rubbery polymer is formed from chemical cross-linking between an isocyanate functional polysiloxane and an amino functional cross-linking agent, an epoxy functional polysiloxane and an amino functional cross-linking agent, or an amino functional polysiloxane and an isocyanate functional cross-linking agent.

Different from glassy polymeric membranes that are highly selective to gases with smaller kinetic diameters over larger diameter gases, the chemically cross-linked rubbery polymeric TFC membrane comprising a thin selective layer of a chemically cross-linked rubbery polymer on top of a porous support membrane formed from a glassy polymer is highly selective to olefins and heavier hydrocarbons over methane and inert gases such as $N_2$ and $H_2$. In addition, opposite from glassy polymeric membranes, the chemically cross-linked rubbery polymeric TFC membrane has improved permeance and selectivity with the increase of operating time due to the increase of plasticization of condensable olefins on the membrane or with the decrease of operating temperature.

The porous support membrane can be formed from any glassy polymer that has good film forming properties such as PES, PSF, PI, a blend of PES and PI, a blend of PSF and PI, and a blend of CA and CTA. The porous support membrane used for the preparation of the new chemically cross-linked rubbery polymeric TFC membrane is fabricated using a phase inversion process by casting the glassy polymer solution using a casting knife or spinning the glassy polymer solution using a spinneret. The porous support membrane described in the current invention can be either asymmetric integrally skinned membrane or TFC membrane with either flat sheet (spiral wound) or hollow fiber geometry.

A porous support membrane is used for the preparation of the new chemically cross-linked rubbery polymeric TFC membrane by coating a thin selective layer of a chemically cross-linked rubbery polymer on top of the porous support membrane. The porous support membrane for the preparation of the new chemically cross-linked rubbery polymeric TFC membrane has a carbon dioxide permeance of at least 100 GPU and no carbon dioxide/methane selectivity at 50° C. under 30 to 100 psig 10% $CO_2$/90% $CH_4$ mixed gas feed pressure.

The solvents used for dissolving the glassy polymer material for the preparation of the porous support membrane are chosen primarily for their ability to completely dissolve the polymers, ease of solvent removal in the membrane formation steps, and their function for the formation of small pores on the skin layer of the support membrane. Other considerations in the selection of solvents include low toxicity, low corrosive activity, low environmental hazard potential, availability and cost. Representative solvents include most amide solvents that are typically used for the formation of the porous support membrane, such as N-methylpyrrolidone (NMP) and N,N-dimethyl acetamide (DMAc), methylene chloride, tetrahydrofuran (THF), acetone, methyl acetate, isopropanol, n-octane, n-hexane, n-decane, methanol, ethanol, N,N-dimethylformamide (DMF), dimethyl sulfoxide (DMSO), lactic acid, citric acid, dioxanes, 1,3-dioxolane, glycerol, mixtures thereof, others known to those skilled in the art and mixtures thereof. Preferably, the solvents used for dissolving the glassy polymer material for the preparation of the porous support membrane include NMP, 1,3-dioxolane, glycerol, and n-decane.

The thin selective layer of the chemically cross-linked rubbery polymer is formed on top of the porous support membrane by applying a dilute solution of a mixture of an isocyanate functional polysiloxane and an amino functional cross-linking agent, or an epoxy functional polysiloxane and an amino functional cross-linking agent, or an amino functional polysiloxane and an isocyanate functional cross-linking agent to the top surface of the porous support membrane by dip-coating, spin coating, casting, soaking, spraying, painting, and other known conventional solution coating technologies. The thin selective layer of the chemically cross-linked rubbery polymer is formed by chemical cross-linking between the isocyanate functional polysiloxane and the amino functional cross-linking agent, or the epoxy functional polysiloxane and the amino functional cross-linking agent, or the amino functional polysiloxane and the isocyanate functional cross-linking agent after evaporating the hydrocarbon organic solvent(s) and heating at 70° to 150° C. for a certain time.

The isocyanate functional polysiloxane used for the preparation of the new chemically cross-linked rubbery polymeric TFC membrane is isocyanate-terminated polyorganosiloxanes such as isocyanate-terminated polydimethylsiloxane.

The amine functional polysiloxane used for the preparation of the new chemically cross-linked rubbery polymeric TFC membrane can be selected from amine-terminated polyorganosiloxane, aminoorganomethylsiloxane-dimethylsiloxane copolymer, or a mixture thereof. An example of the amine-terminated polyorganosiloxane is aminopropyl-terminated polydimethylsiloxane as shown in formula (I)

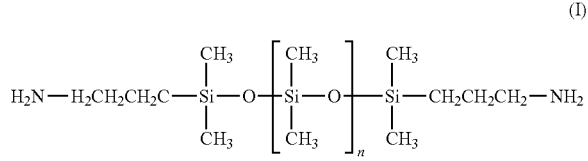

(I)

wherein n is an integer from 10 to 1000. The aminoorganomethylsiloxane-dimethylsiloxane copolymer comprises a plurality of a repeating units of formula (II)

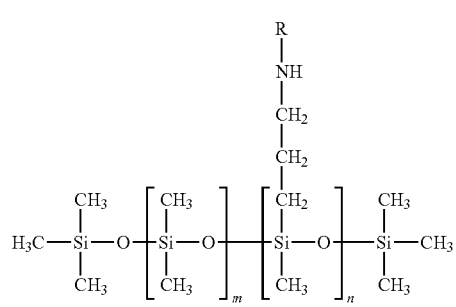

(II)

wherein —R is —H or —CH$_2$CH$_2$NH$_2$, wherein n and m are independent integers from 2 to 1000 and the molar ratio of n to m is in a range of 1:500 to 1:5.

The epoxy functional polysiloxane used for the preparation of the new chemically cross-linked rubbery polymeric TFC membrane can be selected from epoxy-terminated polyorganosiloxane, epoxycyclohexylmethylsiloxane-dimethylsiloxane copolymer, or a mixture thereof. An example of the epoxy-terminated polyorganosiloxane is epoxypropoxypropyl-terminated polydimethylsiloxane as shown in formula (III)

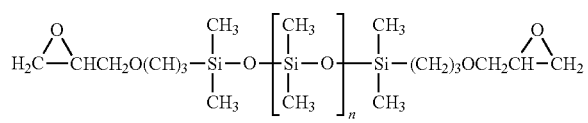

(III)

wherein n is an integer from 0 to 500. The epoxycyclohexylmethylsiloxane-dimethylsiloxane copolymer comprises a plurality of a repeating units of formula (IV)

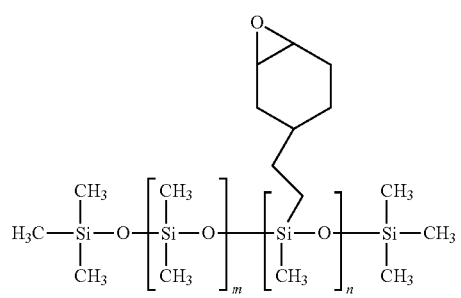

(IV)

wherein n and m are independent integers from 2 to 1000 and the molar ratio of n to m is in a range of 1:500 to 1:5.

The amino functional cross-linking agent that will chemically cross-link with either the epoxy functional polysiloxane or the isocyanate functional polysiloxane for the formation of the new chemically cross-linked rubbery polymeric TFC membrane is selected from said amine functional polysiloxanes or diaminoorganosilicone such as bis(3-aminopropyl)-tetramethyldisiloxane.

The isocyanate functional cross-linking agent that will chemically cross-link with amine functional polysiloxane for the formation of the new chemically cross-linked rubbery polymeric TFC membrane can be selected from said isocyanate-terminated polyorganosiloxanes such as isocyanate-terminated polydimethylsiloxane, tolylene-2,4-diisothiocyanate, tolylene-2,6-diisothiocyanate, tolylene-2,4-diisocyanate, tolylene-2,5-diisocyanate, tolylene-2,6-diisocyanate, tolylene-α,4-diisocyanate, 4,4'-methylenebis(phenyl isocyanate), 1,3-phenylene diisocyanate, hexamethylene diisocyanate, 1,4-phenylene diisocyanate, or mixtures thereof.

The organic solvents that can be used for dissolving the isocyanate functional polysiloxane, the amino functional cross-linking agent, the epoxy functional polysiloxane, the amino functional polysiloxane and the isocyanate functional cross-linking agent are essentially hydrocarbons such as n-heptane, n-hexane, n-octane, or mixtures thereof. It is preferred that these polyorganosiloxanes and cross-linking agents are diluted in the hydrocarbon organic solvent or mixtures thereof in a concentration of from about 1 to about 20 wt % to provide a defect-free thin chemically cross-linked rubbery polymer selective layer.

The present invention also discloses a method of making the new chemically cross-linked rubbery polymeric TFC membrane comprising a thin selective layer of a chemically cross-linked rubbery polymer on top of a porous support membrane comprising: a) preparation of a porous support membrane from a glassy polymer such as polyethersulfone (PES), polysulfone (PSF), polyimide (PI), a blend of PES and PI, a blend of PSF and PI, and a blend of cellulose acetate (CA) and cellulose triacetate (CTA) via a phase inversion membrane fabrication process; b) coating a thin layer of a dilute hydrocarbon solution of a mixture of an isocyanate functional polysiloxane and an amino functional cross-linking agent, or a mixture of an epoxy functional polysiloxane and an amino functional cross-linking agent, or a mixture of an amino functional polysiloxane and an isocyanate functional cross-linking agent to the top surface of the porous support membrane by dip-coating, spin coating, casting, soaking, spraying, painting, and other known conventional solution coating technologies; c) evaporating the hydrocarbon organic solvents on said membrane and heating the coated membrane at 70° to 150° C. for a certain time, and the thin selective layer of the chemically cross-linked rubbery polymer is formed by chemical cross-linking between the isocyanate functional polysiloxane and the amino functional cross-linking agent, or between the epoxy functional polysiloxane and the amino functional cross-linking agent, or between the amino functional polysiloxane and the isocyanate functional cross-linking agent.

The new type of chemically cross-linked rubbery polymeric TFC membrane comprising a thin selective layer of a chemically cross-linked rubbery polymer on top of a porous support membrane can be fabricated into any convenient form suitable for a desired separation application. For example, the membranes can be in the form of hollow fibers, tubes, flat sheets, and the like. The new chemically cross-linked rubbery polymeric TFC membrane comprising a thin selective layer of a chemically cross-linked rubbery polymer on top of a porous support membrane can be assembled in a separator in any suitable configuration for the form of the membrane and the separator may provide for co-current, counter-current, or cross-current flows of the feed on the retentate and permeate sides of the membrane. In one exemplary embodiment, the new chemically cross-linked rubbery polymeric TFC membrane comprising a thin selective layer of a chemically cross-linked rubbery polymer on top of a porous support membrane is in a spiral wound module that is in the form of flat sheet having a thickness from about 30 to about 400 µm. In another exemplary embodiment, the new chemically cross-linked rubbery polymeric TFC membrane comprising a thin selective layer of a chemically cross-linked rubbery polymer on top of a porous support membrane is in a hollow fiber module that is in the form of thousands, tens of thousands, hundreds of thousands, or more, of parallel, closely-packed hollow fibers or tubes. In one embodiment, each fiber has an outside diameter of from about 200 micrometers (µm) to about 700 millimeters (mm) and a wall thickness of from about 30 to about 200 µm. In operation, a feed contacts a first surface of said chemically cross-linked rubbery polymeric TFC membrane comprising a thin selective layer of a chemically cross-linked rubbery polymer on top of a porous support membrane, a permeate permeates said membrane and is removed therefrom, and a retentate, not having permeated said membrane, also is removed therefrom. In another embodiment, the chemically cross-linked rubbery polymeric TFC membrane comprising a thin selective layer of a chemically cross-linked rubbery polymer on top of a porous support membrane can be in the form of flat sheet having a thickness in the range of from about 30 to about 400 µm.

The new chemically cross-linked rubbery polymeric TFC membrane comprising a thin selective layer of a chemically cross-linked rubbery polymer on top of a porous support membrane disclosed has higher permeance for paraffins such as ethane, propane, n-butane, and olefins such as propylene, n-butene, ethylene than inert gases such as $N_2$ and $H_2$ as well as $CH_4$ and has significantly higher selectivities for olefin/nitrogen, hydrocarbon/nitrogen, olefin/hydrogen, hydrocarbon/hydrogen, and C2+ hydrocarbon/methane than thermally cross-linked RTV615A/B silicone rubber membrane and UV cross-linked epoxysilicone rubbery membrane for olefin and $N_2$ recovery, LPG recovery, and fuel gas conditioning applications (see Tables 3, 4, 5).

This invention involves the use of new chemically cross-linked rubbery polymeric TFC membrane comprising a thin selective layer of a chemically cross-linked rubbery polymer on top of a porous support membrane described in the current invention together with a high performance Separex glassy polymeric membrane in a multi-stage membrane system for olefin recovery, LPG recovery, fuel gas conditioning, natural gas dew point control, nitrogen removal from natural gas, etc. Multiple cross-linked rubbery polymeric membranes may be employed, and the multiple membranes may be the same or different. Multiple glassy polymeric membranes may be employed and the multiple membranes may be the same or different. In one embodiment, nitrogen may be the component being separated from another component. In another embodiment, carbon dioxide may be the component being separated from another component.

At least one parameter of the process may be controlled by measuring a value and adjusting the process as a result of the measured value. Examples of the value may be any operating condition, or a concentration of component of a stream. Automation and computers may be used in the measuring and adjusting.

In one embodiment of the invention, as shown in FIG. 1, a natural gas feed 100 containing methane, a low concentration of carbon dioxide (30 mol % or lower) and a low concentration of nitrogen (15 mol % or lower) is contacted with a glassy membrane 102 such as Separex™ Flux, Flux+, Select, cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, or polymer with intrinsic microporosity membrane thereby providing a first permeate stream 104 enriched in carbon dioxide and nitrogen with some methane and providing a first retentate stream 106 comprising the natural gas depleted in nitrogen and carbon dioxide. The first retentate stream 106 is contacted with a rubbery membrane as described herein 108 to provide a second permeate stream 112 comprising largely methane as a methane product stream and providing a second retentate stream 110 comprising a stream enriched in nitrogen with some carbon dioxide. Streams 104 and 110 may be combined to form stream 114 which may be a waste stream.

Figure 2:
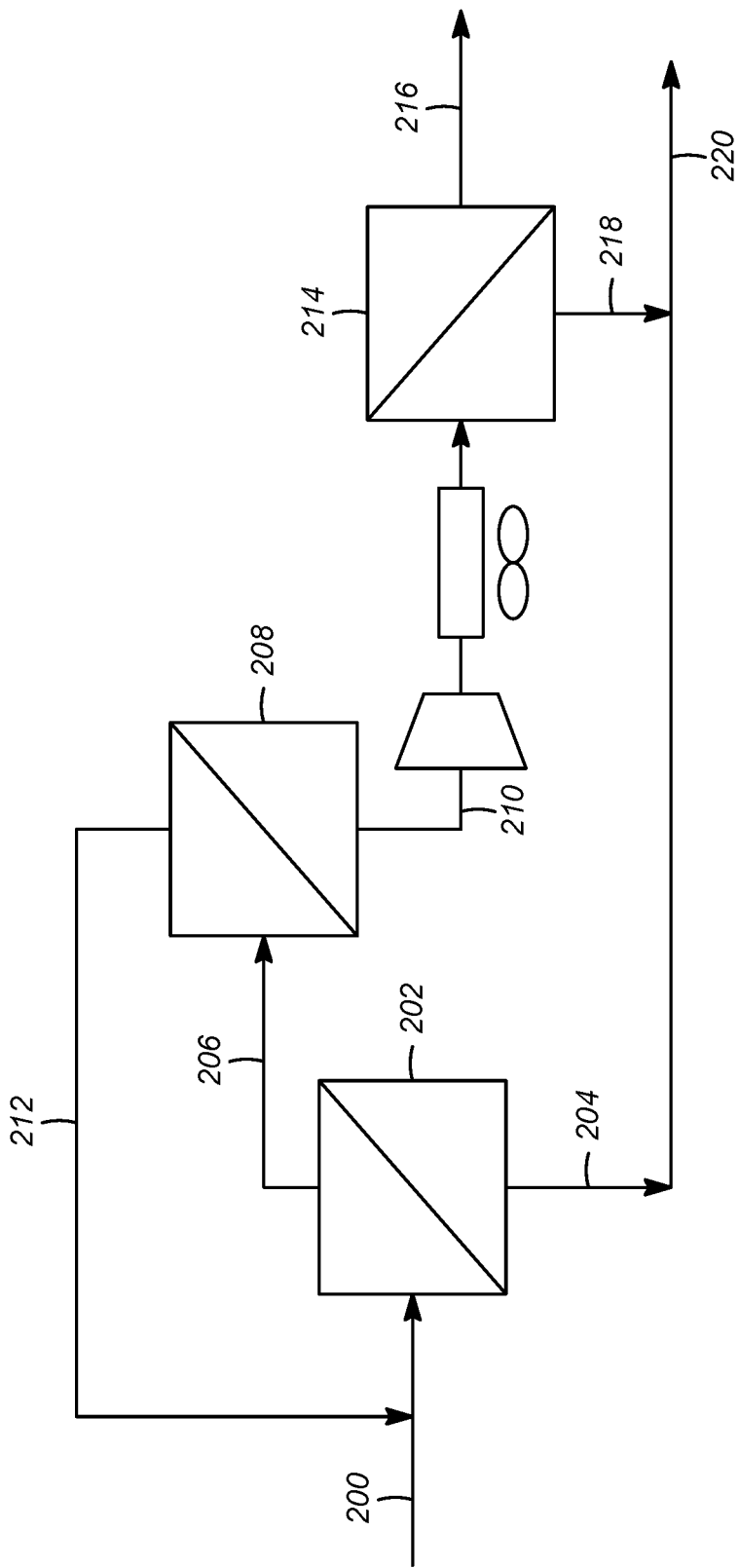
FIG. 2 shows a separation process flow scheme embodiment employing a glassy polymeric membrane and two rubbery polymeric membranes.

In one embodiment of the invention, as shown in FIG. 2, a natural gas feed 200 containing methane, a low concentration of carbon dioxide (30 mol % or lower) and a low concentration of nitrogen (15 mol % or lower) is contacted with a glassy polymeric membrane 202 such as Separex™ Flux, Flux+, Select, cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, or polymer with intrinsic microporosity membrane thereby providing a first permeate stream 204 enriched in carbon dioxide and nitrogen with some methane and providing a first retentate stream 206 comprising the natural gas depleted in nitrogen and carbon dioxide. The first retentate stream 206 is contacted with a first rubbery membrane as described herein 208 to provide a second permeate stream 210 comprising largely methane and providing a second retentate stream 212 comprising a stream enriched in nitrogen and carbon dioxide. Stream 212 is recycled to the feed stream 200 to retain as much methane as possible. Stream 210 comprising methane with some nitrogen is contacted with a second rubbery membrane 214 to provide a third permeate stream 216 comprising methane depleted in nitrogen and a third retentate stream 218 enriched in nitrogen. Streams 204 and 218 may be combined to form stream 220 which may be a waste stream.

Figure 3:
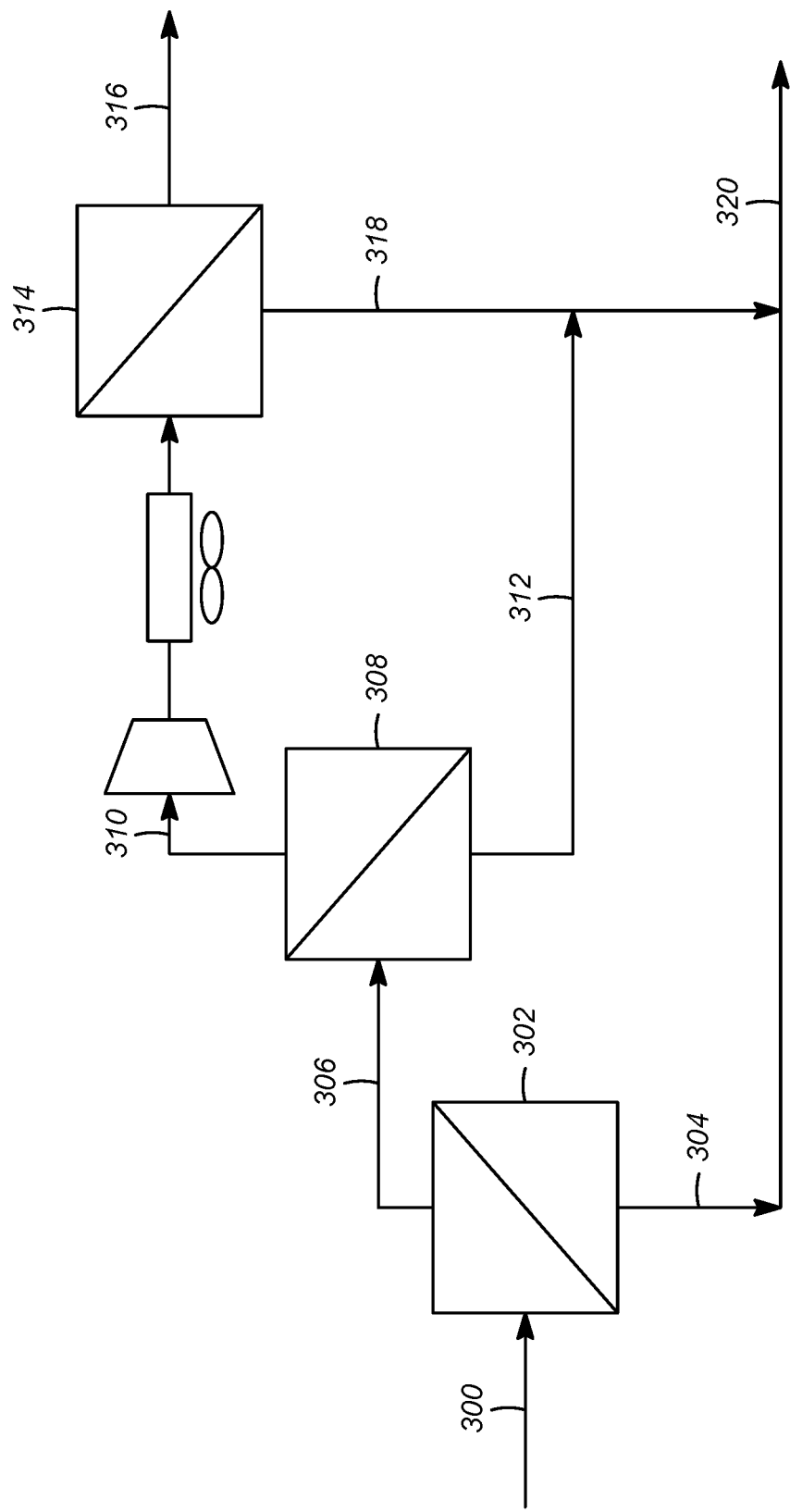
FIG. 3 shows a separation process flow scheme embodiment employing a glassy polymeric membrane and two rubbery polymeric membranes.

In one embodiment of the invention, as shown in FIG. 3, a natural gas feed 300 containing methane, a low concentration of carbon dioxide (30 mol % or lower) and a high concentration of nitrogen (higher than 15 mol %) is contacted with a glassy polymeric membrane 302 such as Separex™ Flux, Flux+, Select, cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, or polymer with intrinsic microporosity membrane thereby providing a first permeate stream 304 enriched in carbon dioxide and nitrogen with some methane and providing a first retentate stream 306 comprising the natural gas depleted in nitrogen and carbon dioxide. The first retentate stream 306 is contacted with a first rubbery membrane as described herein 308 to provide a second permeate stream 310 comprising largely methane with some nitrogen and providing a second retentate stream 312 comprising a stream enriched in nitrogen. Stream 310 comprising methane with some nitrogen is contacted with a second rubbery membrane 314 to provide a third permeate stream 316 comprising methane depleted in nitrogen and a third retentate stream 318 enriched in nitrogen. Streams 304, 312 and 318 may be combined to form stream 320 which may be a waste stream.

Figure 4:
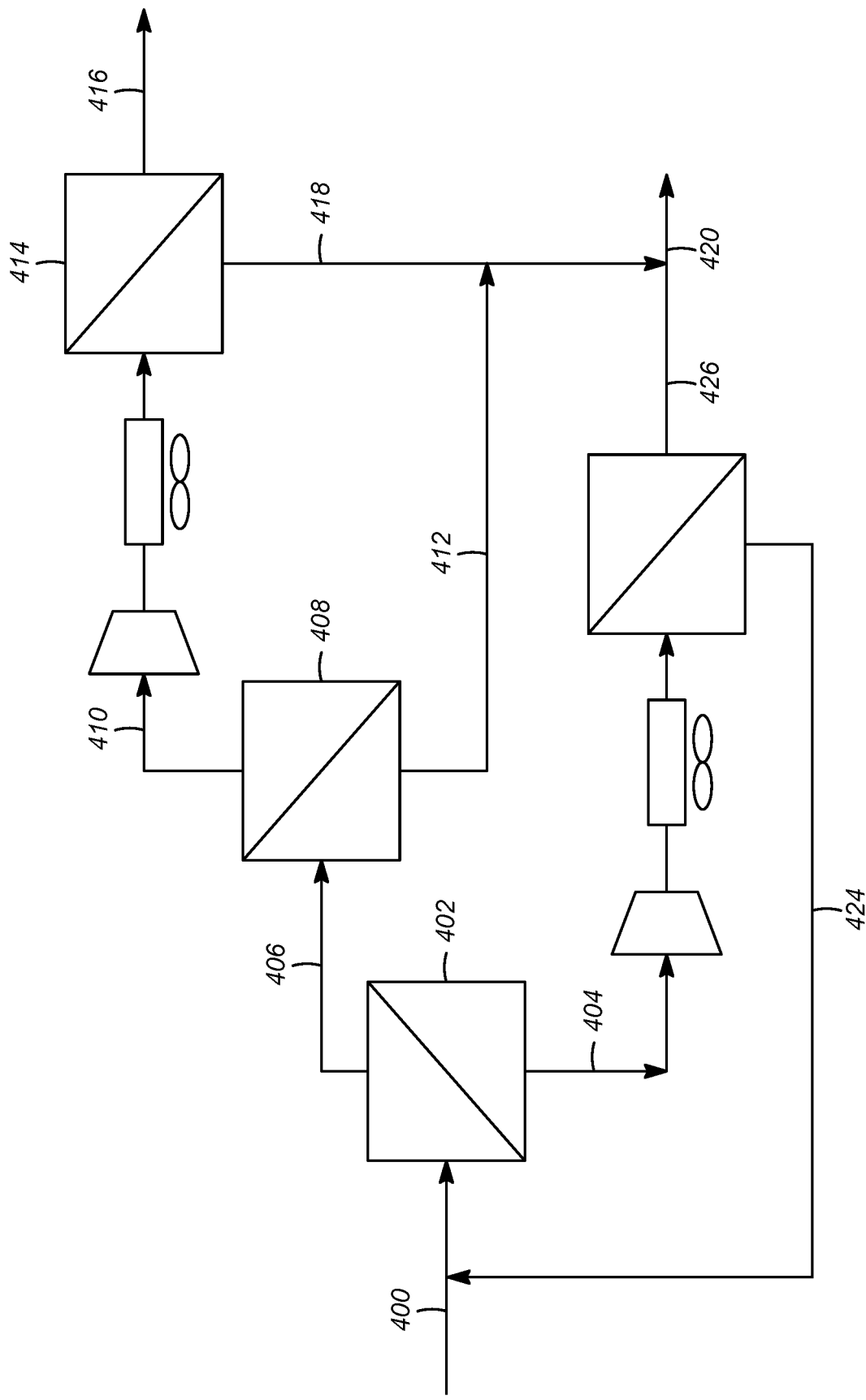
FIG. 4 shows a separation process flow scheme embodiment employing two glassy polymeric membranes and two rubbery polymeric membranes.

In one embodiment of the invention, as shown in FIG. 4, a natural gas feed 400 containing methane, a low concentration of carbon dioxide (30 mol % or lower) and a high concentration of nitrogen (higher than 15 mol %) is contacted with a glassy polymeric membrane 402 such as Separex™ Flux, Flux+, Select, cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, or polymer with intrinsic microporosity membrane thereby providing a first permeate stream 404 enriched in carbon dioxide and nitrogen with some methane and providing a first retentate stream 406 comprising the natural gas depleted in nitrogen and virtually all carbon dioxide. The first permeate stream 404 is contacted with second glassy polymeric membrane 422 to provide permeate stream 426 enriched in carbon dioxide and nitrogen with some methane and a retentate stream 424 of methane depleted in nitrogen and carbon dioxide. The second retentate stream 424 is recycled to feed 400 to retain as much methane as possible. The first retentate stream 406 is contacted with a first rubbery membrane as described herein 408 to provide a second permeate stream 410 comprising largely methane with some nitrogen and providing a second retentate stream 412 comprising a stream enriched in nitrogen. Stream 410 comprising methane with some nitrogen is contacted with a second rubbery membrane 414 to provide a third permeate stream 416 comprising methane depleted in nitrogen and a third retentate stream 418 enriched in nitrogen. Stream 416 may be collected as product. Streams 426, 412 and 418 may be combined to form stream 420 which may be a waste stream.

Figure 5:
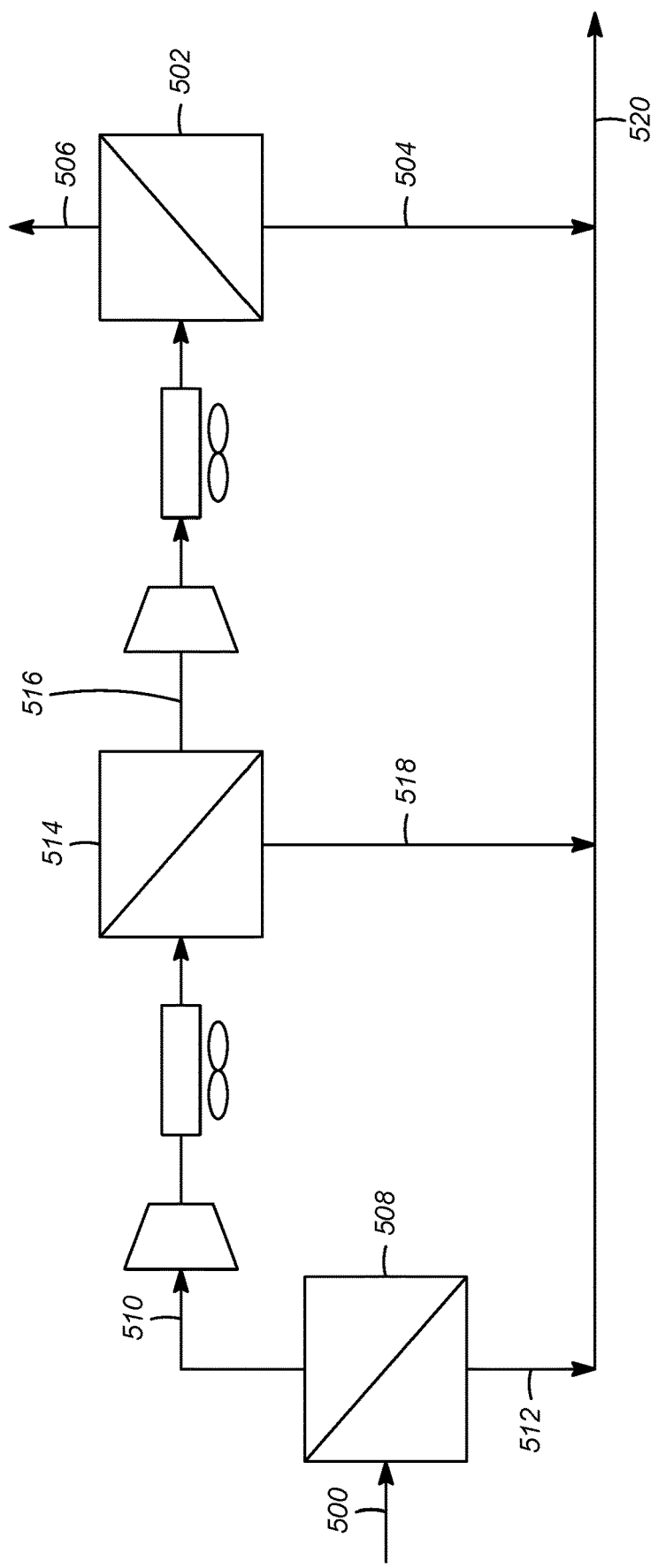
FIG. 5 shows a separation process flow scheme embodiment employing a glassy polymeric membrane and two rubbery polymeric membranes.

In one embodiment of the invention, as shown in FIG. 5, a natural gas feed 500 containing methane, a low concentration of carbon dioxide (30 mol % or lower) and a high concentration of nitrogen (higher than 15 mol %) is contacted with a rubbery polymeric membrane as described herein 508 thereby providing a first permeate stream 510 of methane depleted in carbon dioxide and nitrogen and providing a first retentate stream 512 comprising largely nitrogen and carbon dioxide. The first permeate stream 510 is contacted with a second rubbery polymeric membrane 514 to provide second permeate stream 516 comprising methane further depleted in carbon dioxide and nitrogen and a retentate stream 518 of largely carbon dioxide and nitrogen. The second permeate stream 516 is contacted with a glassy polymeric membrane 502 such as Separex™ Flux, Flux+, Select, cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, or polymer with intrinsic microporosity membrane to provide a third permeate stream 504 enriched in nitrogen and providing a third retentate stream 506 comprising largely methane with some nitrogen. Stream 506 may be collected as product. Streams 512, 518 and 504 may be combined to form stream 520 which may be a waste stream.

Figure 6:
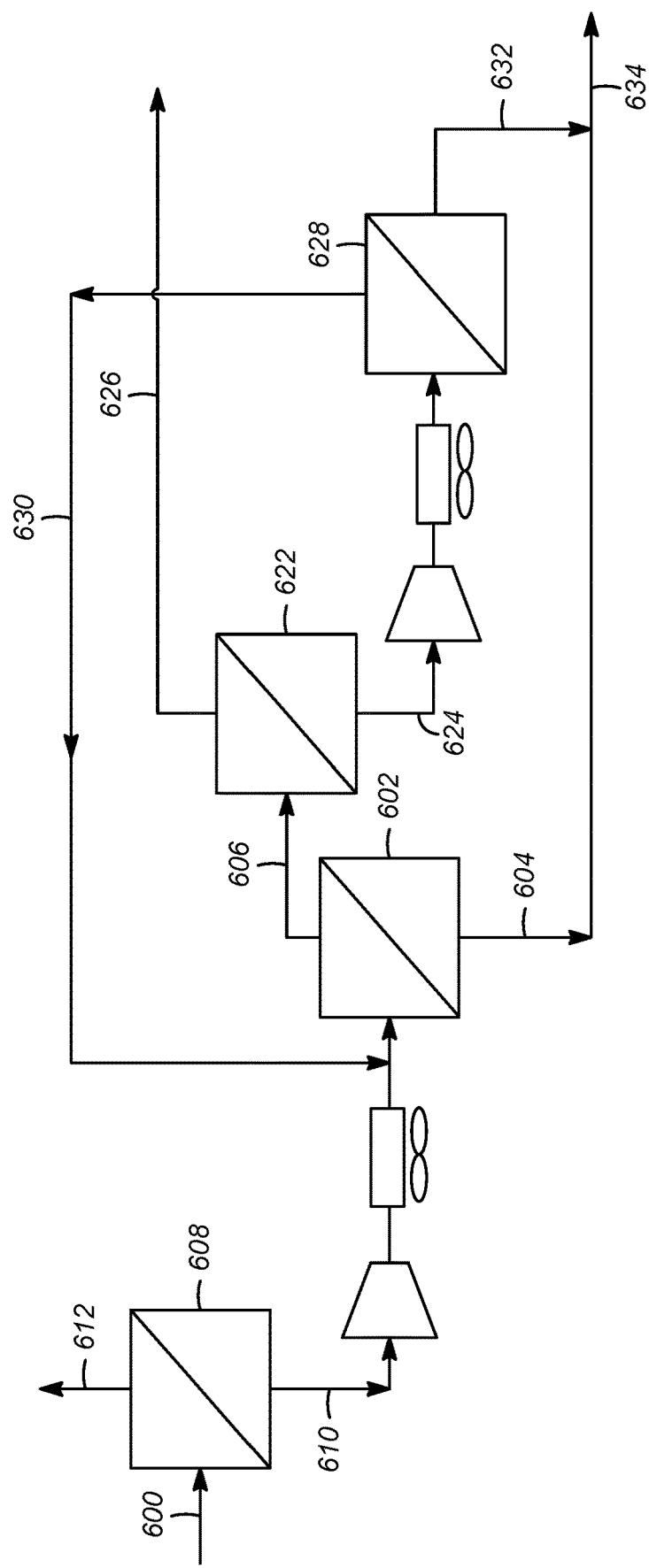
FIG. 6 shows a separation process flow scheme embodiment employing three glassy polymeric membranes and a rubbery polymeric membrane.

In one embodiment of the invention, as shown in FIG. 6, a natural gas feed 600 containing methane, a high concentration of carbon dioxide (higher than 30 mol %) and a low concentration of nitrogen (15 mol % or lower) is contacted with a rubbery polymeric membrane as described herein 608 thereby providing a first permeate stream 610 of methane depleted in carbon dioxide and nitrogen and providing a first retentate stream 612 comprising largely nitrogen and carbon dioxide. The first permeate stream 610 is contacted with a first glassy polymeric membrane 602 such as Separex™ Flux, Flux+, Select, cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, or polymer with intrinsic microporosity membrane to provide second permeate stream 604 comprising largely carbon dioxide and nitrogen and a second retentate stream 606 of methane depleted in carbon dioxide and nitrogen. The second retentate stream 606 is contacted with a second glassy polymeric membrane 622 such as Separex™ Flux, Flux+, Select, cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, or polymer with intrinsic microporosity membrane to provide a third permeate stream 624 enriched in nitrogen and carbon dioxide and providing a third retentate stream 626 comprising largely methane with some nitrogen. The third permeate stream 624 is contacted with a third glassy polymeric membrane 628 such as Separex™ Flux, Flux+, Select, cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, or polymer with intrinsic microporosity membrane to provide a fourth permeate stream 632 enriched in nitrogen and carbon dioxide and providing a fourth retentate stream 630 comprising largely methane with some carbon dioxide. The fourth retentate stream is recycled to stream 610 to retain as much methane as possible. Stream 626 may be collected as product. Streams 604 and 632 may be combined to form stream 634 which may be a waste stream.

Figure 7:
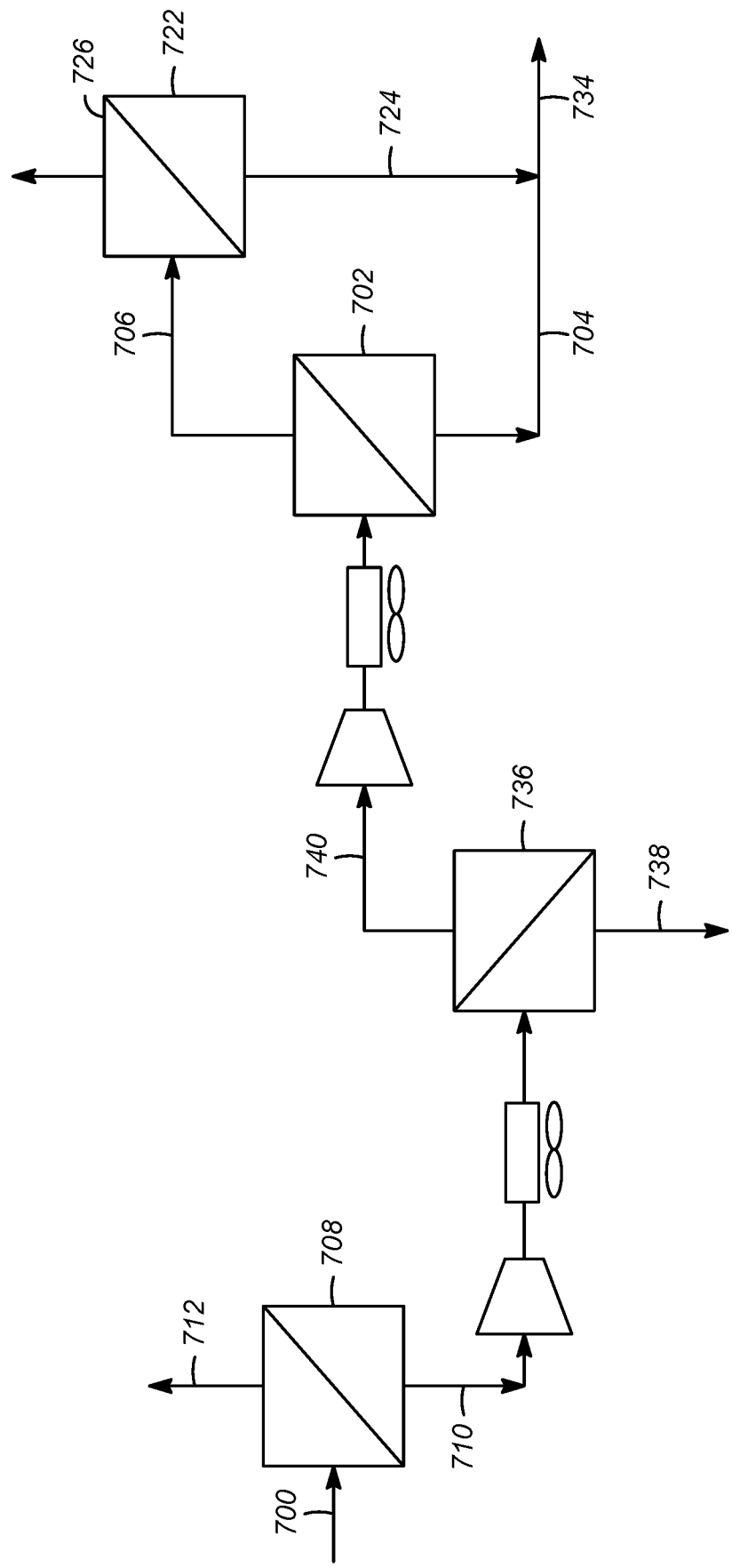
FIG. 7 shows a separation process flow scheme embodiment employing two glassy polymeric membranes and two rubbery polymeric membranes.

In one embodiment of the invention, as shown in FIG. 7, a natural gas feed 700 containing methane, a high concentration of carbon dioxide (higher than 30 mol %) and a low concentration of nitrogen (15 mol % or lower) is contacted with a first rubbery polymeric membrane as described herein 708 thereby providing a first permeate stream 710 of methane depleted in carbon dioxide and nitrogen and providing a first retentate stream 712 comprising largely nitrogen and carbon dioxide. The first permeate stream 710 is contacted with a second rubbery polymeric membrane as described herein 736 thereby providing a second permeate stream 740 of methane depleted in carbon dioxide and nitrogen and providing a second retentate stream 738 comprising largely nitrogen and carbon dioxide. The second permeate stream 740 is contacted with a first glassy polymeric membrane 702 such as Separex™ Flux, Flux+, Select, cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, or polymer with intrinsic microporosity membrane to provide a third permeate stream 704 comprising largely carbon dioxide and nitrogen and a third retentate stream 706 of methane depleted in carbon dioxide and nitrogen. The third retentate stream 706 is contacted with a second glassy polymeric membrane 722 such as Separex™ Flux, Flux+, Select, cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, or polymer with intrinsic microporosity membrane to provide a fourth permeate stream 724 enriched in nitrogen and carbon dioxide and providing a fourth retentate stream 726 comprising methane depleted in carbon dioxide and nitrogen. Stream 726 may be collected as product. Streams 704 and 724 may be combined to form stream 734 which may be a waste stream.

Figure 8:
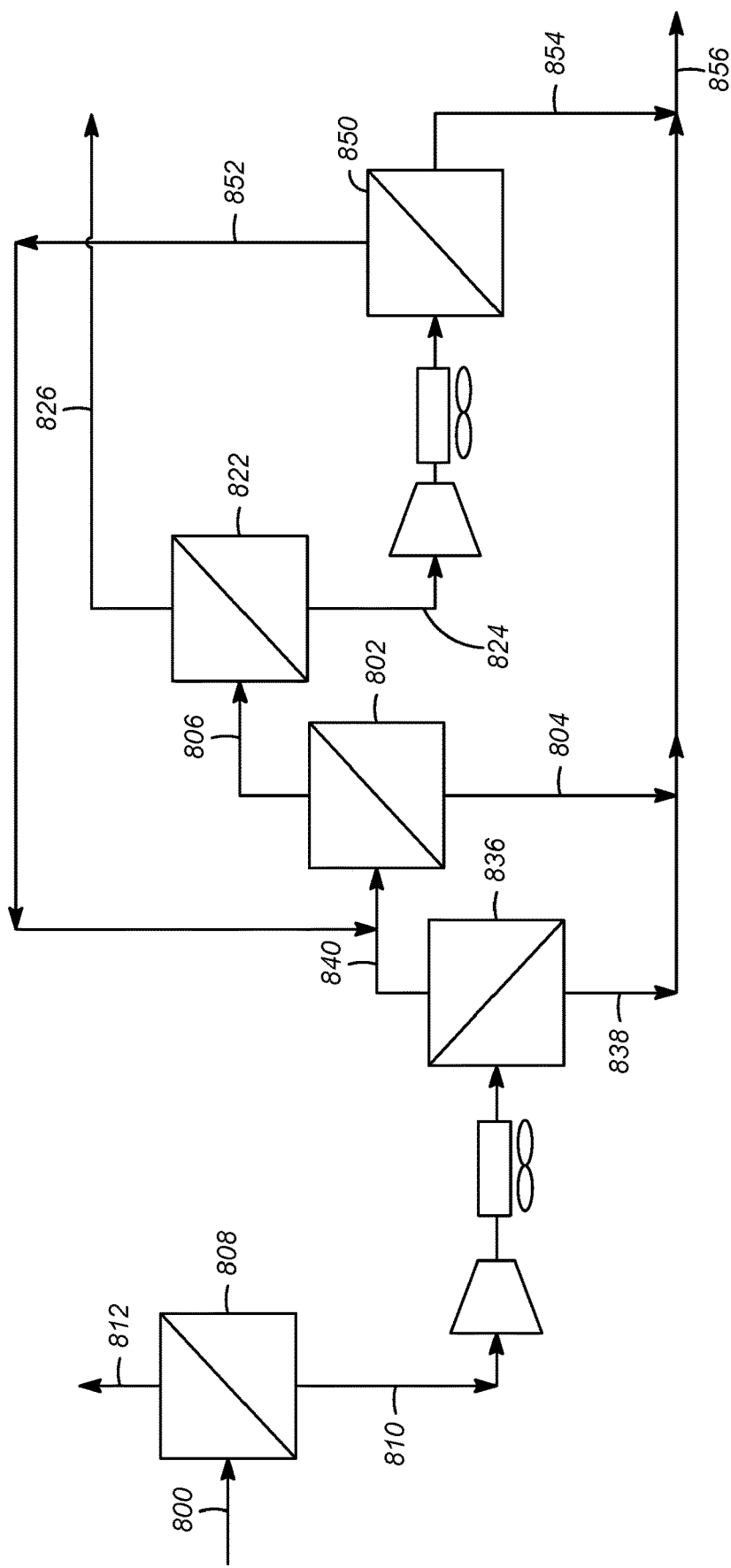
FIG. 8 shows a separation process flow scheme embodiment employing three glassy polymeric membranes and two rubbery polymeric membrane.

In one embodiment of the invention, as shown in FIG. 8, a natural gas feed 800 containing methane, a high concentration of carbon dioxide (higher than 30 mol %) and a high concentration of nitrogen (higher than 15 mol %) is contacted with a first rubbery polymeric membrane as described herein 808 thereby providing a first permeate stream 810 of methane depleted in carbon dioxide and nitrogen and providing a first retentate stream 812 comprising largely nitrogen and carbon dioxide. The first permeate stream 810 is contacted with a second rubbery polymeric membrane as described herein 836 thereby providing a second permeate stream 840 of methane depleted in carbon dioxide and nitrogen and providing a second retentate stream 838 comprising largely nitrogen and carbon dioxide. The second permeate stream 840 is contacted with a first glassy polymeric membrane 802 such as Separex™ Flux, Flux+, Select, cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, or polymer with intrinsic microporosity membrane to provide a third permeate stream 804 comprising largely carbon dioxide and nitrogen and a third retentate stream 806 of methane depleted in carbon dioxide and nitrogen. The third retentate stream 806 is contacted with a second glassy polymeric membrane 822 such as Separex™ Flux, Flux+, Select, cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, or polymer with intrinsic microporosity membrane to provide a fourth permeate stream 824 enriched in nitrogen and carbon dioxide and providing a fourth retentate stream 826 comprising methane depleted in carbon dioxide and nitrogen. Stream 826 may be collected as product. The fourth permeate stream 824 is contacted with a third glassy polymeric membrane 850 such as Separex™ Flux, Flux+, Select, cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, or polymer with intrinsic microporosity membrane to provide a fifth permeate stream 854 enriched in nitrogen and carbon dioxide and providing a fifth retentate stream 852 comprising methane depleted in carbon dioxide and nitrogen. Stream 852 is recycled to stream 840 to retain more methane. Streams 854, 804 and 838 may be combined to form stream 856 which may be a waste stream.

EXAMPLES

The following examples are provided to illustrate one or more preferred embodiments of the invention, but are not limited embodiments thereof. Numerous variations can be made to the following examples that lie within the scope of the invention.

Comparative Example 1

Preparation of 5RTVSi/PES-a TFC Membrane

A porous, asymmetric polyethersulfone (PES) gas separation support membrane was prepared via the phase-inversion process. A PES-a membrane casting dope comprising PES 18 to 25 wt %, NMP 60 to 65 wt %, 1,3-dioxolane 10 to 15 wt %, glycerol 1 to 10 wt % and n-decane 0.5 to 2 wt % was cast on a nylon fabric then gelled by immersion in a 1° C. water bath for about 10 minutes, and then annealed in a hot water bath at 85° C. for about 5 minutes. The wet membrane was dried at 70° C. The dried PES-a porous support membrane was coated with an RTVSi silicone rubber precursor polymer solution comprising RTV615A, RTV615B, and hexane (RTV615A:RTV615B=9:1 (weight ratio), 5 wt % of RTV615A+RTV615B in hexane) and then thermally cross-linked at 85° C. for 1 hour to form a thin, nonporous, dense RTVSi selective layer on the surface of the PES-a support membrane (abbreviated as 5RTVSi/PES-a). The 5RTVSi/PES-a TFC membrane was tested with a fuel gas mixture of 70% C1, 15% C2, 10% C3 and 5% $CO_2$ at 3549 kPa (500 psig) and 25° C. The membrane was also tested with $N_2$, $H_2$, $CH_4$, propylene, and propane single gases at 791 kPa (100 psig) and 2° C.

Example 1

Preparation of 5DMS-RTVB/PES-a TFC Membrane

A porous, asymmetric PES gas separation support membrane was prepared via the phase-inversion process. A PES-a membrane casting dope comprising PES 18 to 25 wt %, NMP 60 to 65 wt %, 1,3-dioxolane 10 to 15 wt %, glycerol 1 to 10 wt % and n-decane 0.5 to 2 wt % was cast on a nylon fabric then gelled by immersion in a 1° C. water bath for about 10 minutes, and then annealed in a hot water bath at 85° C. for about 5 minutes. The wet membrane was dried at 70° C. A 5 wt % DMS-RTV615B pre-cross-linked rubbery polymer solution was prepared by dissolving 6.3 g of fumed silica reinforced vinyl-terminated polydimethylsiloxane (Gelest catalog number: DMS-V31S15) and 0.7 g of RTV615B (Momentive) in 133 g of hexane at room temperature for about 30 minutes. The dried PES-a porous support membrane was coated with the 5 wt % DMS-RTV615B pre-cross-linked polydimethylsiloxane polymer solution, dried at room temperature for about 5 minutes, and then heated at 85° C. for 1.5 to 2 hours to form a thin, nonporous, dense, cross-linked fumed silica reinforced DMS-RTV615B selective layer on the surface of the PES-a support membrane (abbreviated as 5DMS-RTVB/PES-a). The 5DMS-RTVZB/PES-a TFC membrane was tested with a fuel gas mixture of 70% C1, 15% C2, 10% C3 and 5% $CO_2$ at 3549 kPa (500 psig) and 25° C. The membrane was also tested with $N_2$, $H_2$, $CH_4$, propylene, and propane single gases at 791 kPa (100 psig) and 25° C. (Tables 1 and 2).

Example 2

Preparation of 5DMS-RTVAB/PES-a TFC Membrane

A 5DMS-RTVAB/PES-a TFC membrane was prepared using the procedure described in Example 1 except that the PES-a support membrane was coated with a 5 wt % DMS-RTVAB pre-cross-linked fumed silica reinforced polydimethylsiloxane polymer solution comprising 8.4 g of fumed silica reinforced vinyl-terminated polydimethylsiloxane (Gelest catalog number: DMS-V31S15), 4.2 g of RTV615A (Momentive), and 1.4 g of RTV615B (Momentive) in 126 g of hexane at room temperature for about 30 minutes. The coated membrane was dried at room temperature for about 5 minutes, and then heated at 85° C. for 1.5 to 2 hours to form a thin, nonporous, dense, cross-linked DMS-RTV615AB selective layer on the surface of the PES-a support membrane (abbreviated as 5DMS-RTVAB/PES-a). The 5DMS-RTVAB/PES-a TFC membrane was tested with a fuel gas mixture of 70% C1, 15% C2, 10% C3 and 5% $CO_2$ at 3549 kPa (500 psig) and 25° C. The membrane was also tested with $N_2$, $H_2$, $CH_4$, propylene, and propane single gases at 791 kPa (100 psig) and 25° C.

TABLE 1

Pure gas permeation results for 5RTVSi/PES-a and 5DMS-RTVB/PES-a TFC membranes for propylene recovery (propylene ($C_{3=}$)/$N_2$ separation)*

| Membrane | $P_{C3=}/L$ (GPU) | $\alpha_{C3=/N2}$ |
|---|---|---|
| 5RTVSi/PES-a | 2881 | 31.8 |
| 5DMS-RTVB/PES-a | 4771 | 31.6 |

*Tested at room temperature and 791 kPa (100 psig);
1 GPU = $10^{-6}$ cm$^3$(STP)/cm$^2 \cdot$ sec $\cdot$ cmHg

TABLE 2

Pure gas permeation results for 5RTVSi/PES-a and 5DMS-RTVB/PES-a TFC membranes for $CH_4$/$N_2$ separation*

| Membrane | $P_{CH4}/L$ (GPU) | $\alpha_{CH4/N2}$ |
|---|---|---|
| 5RTVSi/PES-a | 278 | 3.05 |
| 5DMS-RTVB/PES-a | 413 | 3.08 |

*Tested at room temperature and 791 kPa (100 psig);
1 GPU = $10^{-6}$ cm$^3$(STP)/cm$^2 \cdot$ sec $\cdot$ cmHg

Example 3

Preparation of 5DMS-TDI/PES-a TFC Membrane

A porous, asymmetric PES gas separation support membrane PES-a was prepared via the phase-inversion process using the same procedure as described in Example 1. A 5 wt % DMS-TDI pre-cross-linked rubbery polymer solution was prepared by dissolving 6.0 g of an aminopropyl-terminated polydimethylsiloxane (Gelest catalog number: DMS-A21) and 0.25 g of 2,4-toluene diisocyanate (TDI) in 118.8 g of hexane at room temperature for about 10 minutes. The dried PES-a porous support membrane was coated with the 5 wt % DMS-TDI pre-cross-linked rubbery polymer solution, dried at room temperature for about 5 minutes, and then heated at 85° C. for 2 hours to form a thin, nonporous, dense, chemically cross-linked DMS-TDI selective layer on the surface of the PES-a support membrane (abbreviated as 5DMS-TDI/PES-a). The 5DMS-TDI/PES-a TFC membrane was tested with a fuel gas mixture of 70% C1, 15% C2, 10% C3 and 5% $CO_2$ at 3549 kPa (500 psig) and 25° C. The membrane was also tested with $N_2$, $H_2$, $CH_4$, propylene, and propane single gases at 791 kPa (100 psig) and 25° C. The membrane permeances (P/L) and selectivities ($\alpha$) are shown in Tables 3, 4, and 5.

Example 4

Preparation of 6.5DMS-TDI/PES-a TFC Membrane

A 6.5DMS-TDI/PES-a TFC membrane was prepared using the procedure described in Example 3 except that the PES-a support membrane was coated with a 6.5 wt % DMS-TDI pre-cross-linked rubbery polymer solution comprising 6.0 g of DMS-A21 and 0.25 g of 2,4-toluene diisocyanate (TDI) in 89.9 g of hexane at room temperature for about 10 minutes. The coated membrane was dried at room temperature for about 5 minutes, and then heated at 85° C. for 2 hours to form a thin, nonporous, dense, chemically cross-linked DMS-TDI selective layer on the surface of the PES-a support membrane (abbreviated as 6.5DMS-TDI/PES-a). The 6.5DMS-TDI/PES-a TFC membrane was tested with a fuel gas mixture of 70% C1, 15% C2, 10% C3 and 5% $CO_2$ at 3549 kPa (500 psig) and 25° C. The membrane was also tested with $N_2$, $H_2$, $CH_4$, propylene, and propane single gases at 791 kPa (100 psig) and 25° C. The membrane permeances (P/L) and selectivities ($\alpha$) are shown in Tables 3 and 4.

Example 5

Preparation of 5DMS-TDI/5DMS-TDI/PES-a Dual-Coated TFC Membrane

A 5DMS-TDI/5DMS-TDI/PES-a dual-coated TFC membrane was prepared using the procedure described in Example 3 except that the PES-a support membrane was first coated with a 5 wt % DMS-TDI pre-cross-linked rubbery polymer solution comprising 6.0 g of DMS-A21 and 0.25 g of 2,4-toluene diisocyanate (TDI) in 118.8 g of hexane at room temperature for about 10 minutes. The coated membrane was dried at room temperature for about 5 minutes, and then heated at 85° C. for 2 hours to form the first layer of thin, nonporous, dense, chemically cross-linked DMS-TDI on the surface of the PES-a support membrane. The DMS-TDI-coated PES-a TFC membrane was then coated with a 5 wt % DMS-TDI pre-cross-linked rubbery polymer solution again, dried at room temperature for about 5 minutes, and then heated at 85° C. for 2 hours to form the second layer of thin, nonporous, dense, chemically cross-linked DMS-TDI on the surface of the DMS-TDI-coated PES-a TFC membrane (abbreviated as 5DMS-TDI/5DMS-TDI/PES-a). The 5DMS-TDI/5DMS-TDI/PES-a dual-coated TFC membrane was tested with a fuel gas mixture of 70% C1, 15% C2, 10% C3 and 5% $CO_2$ at 3549 kPa (500 psig) and 25° C. The membrane was also tested with $N_2$, $H_2$, $CH_4$, propylene, and propane single gases at 791 kPa (100 psig) and 25° C. The membrane permeances (P/L) and selectivities (α) are shown in Tables 3, 4, and 5.

Example 6

Preparation of 5DMS-A-DMS-E/PES-a TFC Membrane

A 5DMS-A-DMS-E/PES-a TFC membrane was prepared using the PES-a support membrane same as that was used in Example 1. A 5 wt % DMS-A-DMS-E pre-cross-linked rubbery polymer solution was prepared by dissolving 3.0 g of an aminopropyl-terminated polydimethylsiloxane (Gelest catalog number: DMS-A21) and 4.5 g of epoxypropoxypropyl-terminated polydimethylsiloxane (Gelest catalog number: DMS-E21) in 142.5 g of hexane at room temperature for about 10 minutes. The dried PES-a porous support membrane was coated with the 5 wt % 5DMS-A-DMS-E pre-cross-linked rubbery polymer solution, dried at room temperature for about 5 minutes, and then heated at 85° C. for 2 hours to form a thin, nonporous, dense, chemically cross-linked DMS-A-DMS-E selective layer on the surface of the PES-a support membrane (abbreviated as 5DMS-A-DMS-E/PES-a). The 5DMS-A-DMS-E/PES-a TFC membrane was tested with a fuel gas mixture of 70% C1, 15% C2, 10% C3 and 5% $CO_2$ at 3549 kPa (500 psig) and 25° C. The membrane was also tested with $N_2$, $H_2$, $CH_4$, propylene, and propane single gases at 791 kPa (100 psig) and 25° C. The membrane permeances (P/L) and selectivities (α) are shown in Tables 3 and 4.

TABLE 3

Pure gas permeation results for 5RTVSi/PES-a, 5DMS-TDI/PES-a, 6.5DMS-TDI/PES-a, 5DMS-TDI/5DMS-TDI/PES-a, and 5DMS-A-DMS-E/PES-a TFC membranes for propylene recovery (propylene ($C_{3=}$)/$N_2$ and $C_{3=}$/$H_2$ separations)*

| Membrane | $P_{C3=}$/L (GPU) | $α_{C3=/N2}$ | $α_{C3=/H2}$ |
|---|---|---|---|
| 5RTVSi/PES-a | 2881 | 31.8 | 10.3 |
| 5DMS-TDI/PES-a | 1370 | 44.7 | 18.7 |
| 6.5DMS-TDI/PES-a | 1069 | 48.7 | 21.3 |
| 5DMS-TDI/5DMS-TDI/PES-a | 635 | 51.0 | 21.4 |
| 5DMS-A-DMS-E/PES-a | 2794 | 41.9 | 15.8 |

*Tested at room temperature and 791 kPa (100 psig);
1 GPU = $10^{-6}$ $cm^3$(STP)/$cm^2$ · sec · cmHg

TABLE 4

Pure gas permeation results for 5RTVSi/PES-a, 5DMS-TDI/PES-a, 6.5DMS-TDI/PES-a, 5DMS-TDI/5DMS-TDI/PES-a, and 5DMS-A-DMS-E/PES-a TFC membranes for liquid petroleum gas (LPG) recovery (propane ($C_3$)/$N_2$ and $C_3$/$H_2$ separations)*

| Membrane | $P_{C3}$/L (GPU) | $α_{C3/N2}$ | $α_{C3/H2}$ |
|---|---|---|---|
| 5RTVSi/PES-a | 3093 | 34.2 | 11.1 |
| 5DMS-TDI/PES-a | 1588 | 51.8 | 21.7 |
| 6.5DMS-TDI/PES-a | 1180 | 53.7 | 23.5 |
| 5DMS-TDI/5DMS-TDI/PES-a | 740 | 59.5 | 25.0 |
| 5DMS-A-DMS-E/PES-a | 3380 | 50.7 | 19.2 |

*Tested at room temperature and 791 kPa (100 psig);
1 GPU = $10^{-6}$ $cm^3$(STP)/$cm^2$ · sec · cmHg

TABLE 5

5DMS-TDI/PES-a and 5DMS-TDI/5DMS-TDI/PES-a TFC membranes for fuel gas conditioning (separation of methane ($CH_4$) from ethane ($C_2$), $C_3$, and $C_{3+}$)*

| Membrane | $P_{CH4}$/L (GPU) | $α_{C2/CH4}$ | $α_{C3/CH4}$ |
|---|---|---|---|
| 5RTVSi/PES-a | 265 | 1.6 | 1.9 |
| 5DMS-TDI/PES-a | 170 | 2.2 | 3.1 |
| 5DMS-TDI/5DMS-TDI/PES-a | 69 | 2.5 | 3.9 |

*Tested at room temperature and 3549 kPa (500 psig) mixed gas comprising 70% $CH_4$, 15% $C_2$, 10% $C_3$, and 5% $CO_2$;
1 GPU = $10^{-6}$ $cm^3$(STP)/$cm^2$ · sec · cmHg

SPECIFIC EMBODIMENTS

While the following is described in conjunction with specific embodiments, it will be understood that this description is intended to illustrate and not limit the scope of the preceding description and the appended claims.

A first embodiment of the invention is a process for removing nitrogen, carbon dioxide, or both from a feed gas comprising (a) contacting the feed gas with a glassy polymeric membrane; (b) contacting the feed gas with a rubbery polymeric membrane wherein the rubbery polymeric membrane is (i) a chemically cross-linked rubbery polymeric thin film composite membrane comprising a selective layer of a chemically cross-linked rubbery polymer supported by a porous support membrane formed from a glassy polymer, or (ii) a high flux, cross-linked, fumed silica reinforced polyorganosiloxane thin film composite membrane comprising a selective layer of a high flux, cross-linked, fumed silica reinforced polyorganosiloxane polymer supported by a porous support membrane formed from a glassy polymer; and (c) collecting a product that is depleted in nitrogen, carbon dioxide, or both. An embodiment of the invention is one, any or all of prior embodiments in this paragraph up through the first embodiment in this paragraph wherein the feed gas is natural gas or hydrogen. An embodiment of the invention is one, any or all of prior embodiments in this paragraph up through the first embodiment in this paragraph wherein the feed gas is contacted with the glassy polymeric membrane before contacting the rubbery polymeric membrane or wherein the feed gas is contacted with the rubbery polymeric membrane before contacting the glassy polymeric membrane. An embodiment of the invention is one, any or all of prior embodiments in this paragraph up through the first embodiment in this paragraph wherein the feed gas is contacted with a second or more glassy polymeric membrane, a second or more rubbery polymeric membrane, or both. An embodiment of the invention is one, any or all of prior embodiments in this paragraph up through the first embodiment in this paragraph wherein the glassy polymeric membrane is selected from a group consisting of cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, fluoropolymer membrane, polymer with intrinsic microporosity membrane, and mixtures thereof. An embodiment of the invention is one, any or all of prior embodiments in this paragraph up through the first embodiment in this paragraph wherein the glassy polymer used to form the porous support membrane is polyethersulfone (PES), polysulfone (PSF), polyimide (PI), a blend of PES and PI, a blend of PSF and PI, or a blend of cellulose acetate (CA) and cellulose triacetate (CTA). An embodiment of the invention is one, any or all of prior embodiments in this paragraph up through the first embodiment in this paragraph wherein the glassy polymeric membrane provides a glassy polymeric membrane retentate stream and a glassy polymeric membrane permeate stream and the glassy polymeric membrane retentate stream, the a glassy polymeric membrane permeate stream, or both are contacted with a second glassy polymeric membrane, a second rubbery membrane, or both. An embodiment of the invention is one, any or all of prior embodiments in this paragraph up through the first embodiment in this paragraph wherein the rubbery polymeric membrane provides a rubbery polymeric membrane retentate stream and a rubbery polymeric membrane permeate stream and the rubbery polymeric membrane retentate stream, the a rubbery polymeric membrane permeate stream, or both are contacted with a second glassy polymeric membrane, a second rubbery membrane, or both. An embodiment of the invention is one, any or all of prior embodiments in this paragraph up through the first embodiment in this paragraph wherein one or more streams is recycled to a membrane located upstream. An embodiment of the invention is one, any or all of prior embodiments in this paragraph up through the first embodiment in this paragraph further comprising controlling at least one parameter of the process by measuring a value and adjusting the process in response to the measured value.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A multi-stage membrane process for removing nitrogen, carbon dioxide, or both from a feed gas comprising:
   (a) contacting the feed gas with a glassy polymeric membrane;
   (b) contacting the feed gas with a rubbery polymeric membrane wherein the rubbery polymeric membrane is a chemically cross-linked rubbery polymeric thin film composite membrane comprising a selective layer of a chemically cross-linked rubbery polymer supported by a porous support membrane formed from a glassy polymer, wherein said chemically cross-linked rubbery polymer is formed from chemical cross-linking between an isocyanate functional polysiloxane and an amino functional cross-linking agent; and
   (c) collecting a product that is depleted in nitrogen, carbon dioxide, or both.

2. The process of claim 1 wherein the feed gas is natural gas or hydrogen.

3. The process of claim 1 wherein the feed gas is contacted with the glassy polymeric membrane before contacting the rubbery polymeric membrane or wherein the feed gas is contacted with the rubbery polymeric membrane before contacting the glassy polymeric membrane.

4. The process of claim 1 wherein the feed gas is contacted with a second or more glassy polymeric membrane, a second or more rubbery polymeric membrane, or both.

5. The process of claim 1 wherein the glassy polymeric membrane is selected from a group consisting of cellulose acetate (CA) membrane, cellulose triacetate (CTA) membrane, blend of CA and CTA membrane, polyimide (PI) membrane, blend of polyethersulfone (PES) and PI membrane, cross-linked PI membrane, cross-linked blend of PI and PES membrane, polybenzoxazole membrane, polysulfone (PSF) membrane, polycarbonate membrane, membrane, and mixtures thereof.

6. The process of claim 1 wherein the glassy polymer used to form the porous support membrane is polyethersulfone (PES), polysulfone (PSF), polyimide (PI), a blend of PES and PI, a blend of PSF and PI, or a blend of cellulose acetate (CA) and cellulose triacetate (CTA).

7. The process of claim 1 wherein the glassy polymeric membrane provides a glassy polymeric membrane retentate stream and a glassy polymeric membrane permeate stream and the glassy polymeric membrane retentate stream, the glassy polymeric membrane permeate stream, or both are contacted with a second glassy polymeric membrane, a second rubbery membrane, or both.

8. The process of claim 1 wherein the rubbery polymeric membrane provides a rubbery polymeric membrane retentate stream and a rubbery polymeric membrane permeate stream and the rubbery polymeric membrane retentate stream, the rubbery polymeric membrane permeate stream, or both are contacted with a second glassy polymeric membrane, a second rubbery membrane, or both.

9. The process of claim 1 wherein one or more streams is recycled to a membrane located upstream.

10. The process of claim 1 further comprising controlling at least one parameter of the process by measuring a value and adjusting the process in response to the measured value.

* * * * *